(12) United States Patent
Da Costa et al.

(10) Patent No.: US 9,958,944 B2
(45) Date of Patent: *May 1, 2018

(54) ENCODING DYNAMIC HAPTIC EFFECTS

(71) Applicant: Immersion Corporation, San Jose, CA (US)

(72) Inventors: Henry Da Costa, Montreal (CA); Feng Tian An, Montreal (CA); Christopher J. Ullrich, Ventura, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/211,463

(22) Filed: Jul. 15, 2016

(65) Prior Publication Data
US 2016/0320845 A1 Nov. 3, 2016

Related U.S. Application Data

(63) Continuation of application No. 14/574,957, filed on Dec. 18, 2014, now Pat. No. 9,396,630, which is a continuation of application No. 13/667,003, filed on Nov. 2, 2012, now Pat. No. 8,947,216.

(51) Int. Cl.
*G08B 6/00* (2006.01)
*G06F 3/01* (2006.01)

(52) U.S. Cl.
CPC .............. *G06F 3/016* (2013.01); *G08B 6/00* (2013.01)

(58) Field of Classification Search
CPC ........ G06F 3/016; G06F 3/041; G06F 3/0414; G06F 2203/014; G06F 2203/04808; G06F 3/0436; G06F 3/04104; G06F 3/01; G06F 3/0416; G08B 6/00

USPC ......... 340/407.1, 407.2, 384.7, 7.6; 345/156, 345/168, 173, 177

See application file for complete search history.

(56) References Cited

U.S. PATENT DOCUMENTS

| | | | |
|---|---|---|---|
| 5,619,628 | A | 4/1997 | Fujita et al. |
| 5,774,386 | A | 6/1998 | Pawle |
| 6,449,019 | B1 | 9/2002 | Fincher et al. |
| 7,594,180 | B1 | 9/2009 | Langmacher et al. |
| 7,765,333 | B2 | 7/2010 | Cruz-Hernandez et al. |
| 8,035,535 | B2 * | 10/2011 | Nousiainen ............... G06F 3/02 341/155 |
| 8,085,170 | B2 | 12/2011 | Li |

(Continued)

FOREIGN PATENT DOCUMENTS

| | | |
|---|---|---|
| CN | 101027631 A | 8/2007 |
| EP | 2325723 A2 | 5/2011 |

(Continued)

OTHER PUBLICATIONS

Information that are not included with this Information Disclosure Statement can be found in U.S. Appl. No. 14/574,957.

*Primary Examiner* — Hung T Nguyen
(74) *Attorney, Agent, or Firm* — Miles & Stockbridge P.C.

(57) ABSTRACT

A system is provided that encodes one or more dynamic haptic effects. The system defines a dynamic haptic effect as including a plurality of key frames, where each key frame includes an interpolant value and a corresponding haptic effect. An interpolant value is a value that specifies where an interpolation occurs. The system generates a haptic effect file, and stores the dynamic haptic effect within the haptic effect file.

17 Claims, 7 Drawing Sheets

(56) References Cited

U.S. PATENT DOCUMENTS

| | | | |
|---|---|---|---|
| 8,179,378 B2 * | 5/2012 | Aono | G06F 3/016 178/18.01 |
| 8,279,193 B1 | 10/2012 | Birnbaum et al. | |
| 8,451,238 B2 * | 5/2013 | Kim | G06F 3/0488 345/173 |
| 8,538,459 B2 * | 9/2013 | Choi | H04M 1/72566 455/412.1 |
| 8,542,185 B2 * | 9/2013 | Jung | G06F 3/0346 345/156 |
| 8,570,162 B2 * | 10/2013 | Ujii | G03B 17/38 178/18.01 |
| 8,736,559 B2 * | 5/2014 | Pertuit | G06F 3/0414 345/173 |
| 9,092,057 B2 * | 7/2015 | Varela | G06F 3/016 |
| 9,122,311 B2 * | 9/2015 | Galor | G09G 5/34 |
| 9,417,695 B2 * | 8/2016 | Griffin | G06F 3/016 |
| 2002/0163498 A1 | 11/2002 | Chang et al. | |
| 2005/0124412 A1 | 6/2005 | Son et al. | |
| 2006/0066588 A1 | 3/2006 | Lyon et al. | |
| 2008/0198139 A1 | 8/2008 | Lacroix et al. | |
| 2008/0204266 A1 | 8/2008 | Malmberg et al. | |
| 2008/0223627 A1 | 9/2008 | Lacroix et al. | |
| 2008/0294984 A1 | 11/2008 | Ramsay et al. | |
| 2009/0128306 A1 | 5/2009 | Luden et al. | |
| 2009/0195538 A1 | 8/2009 | Ryu et al. | |
| 2009/0231271 A1 | 9/2009 | Heubel et al. | |
| 2009/0303175 A1 | 12/2009 | Koivunen | |
| 2010/0066512 A1 | 3/2010 | Rank | |
| 2010/0148945 A1 | 6/2010 | Yun et al. | |
| 2010/0156818 A1 | 6/2010 | Burrough et al. | |
| 2010/0225456 A1 | 9/2010 | Eldering | |
| 2010/0287311 A1 | 11/2010 | Cruz-Hernandez et al. | |
| 2011/0115734 A1 | 5/2011 | Harashima et al. | |
| 2012/0081337 A1 | 4/2012 | Camp, Jr. et al. | |
| 2013/0207904 A1 | 8/2013 | Short et al. | |
| 2014/0015761 A1 | 1/2014 | Fleming | |
| 2014/0160034 A1 | 6/2014 | Da Costa et al. | |

FOREIGN PATENT DOCUMENTS

| | | |
|---|---|---|
| JP | 2002149312 A | 5/2002 |
| JP | 2005332063 A | 12/2005 |
| JP | 2006058973 A | 3/2006 |
| JP | 2006146259 A | 6/2006 |
| JP | 2006198473 A | 8/2006 |
| JP | 2008257295 A | 10/2008 |
| JP | 2011129091 A | 6/2011 |
| JP | 2011154559 A | 8/2011 |
| JP | 2011159110 A | 8/2011 |
| JP | 2012137888 A | 7/2012 |
| WO | 2006019389 A2 | 2/2006 |
| WO | 2012063165 A1 | 5/2012 |
| WO | 2013186847 A1 | 12/2013 |

* cited by examiner

| Byte Values | Meaning |
|---|---|
| 0xC1 | KeyFrame Event. |
| 0xE0 | EffectNameAsOffsetU8 property header byte. |
| 0x03 | The basis effect definition starts at offset *0x18* ( = 0x03 * 8) from the base address of the basis effect storage block. |
| 0xE6 | InterpolantU16 property header byte. Expect to find an interpolant in the next two bytes. |
| 0x01 | Interpolant MSB |
| 0xF4 | Interpolant LSB |
| 0xE2 | RepeatGapU16 property header byte. Expect to find a duration in milliseconds in the next two bytes. |
| 0x01 | RepeatGap MSB |
| 0xF4 | RepeatGap LSB |
| 0xC1 | KeyFrame Event. |
| 0xE2 | EffectNameAsOffsetU16 property header byte. |
| 0x00 | Basis effect definition MSB |
| 0x00 | Basis effect definition LSB |
| 0xE6 | InterpolantU16 property header byte. Expect to find an interpolant in the next two bytes. |
| 0x03 | Interpolant MSB |
| 0xE8 | Interpolant LSB |
| 0xCF | EndOfDynamicHapticEffect frame. This event signals the end of the frame list. |

Rows 510 (first group), 520 (second group), 530 (last row). Table 500.

Fig. 5

ENCODING DYNAMIC HAPTIC EFFECTS

CROSS-REFERENCE TO RELATED APPLICATIONS

This application is a continuation of application Ser. No. 14/574,957, filed on Dec. 18, 2014, which issued as U.S. Pat. No. 9,396,630 on Jul. 19, 2016, the specification of which is hereby incorporated by reference. U.S. patent application Ser. No. 14/574,957 is a continuation U.S. patent application Ser. No. 13/667,003, filed on Nov. 2, 2012, which issued as U.S. Pat. No. 8,947,216 on Feb. 3, 2015, the specification of which is also hereby incorporated by reference.

FIELD

One embodiment is directed generally to haptic effects, and more particularly, to encoding dynamic haptic effects.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, referred to as "handheld devices" or "portable devices," such as cellular telephones, personal digital assistants ("PDA's"), smartphones, and portable gaming devices. For example, some portable gaming applications are capable of vibrating in a manner similar to control devices (e.g., joysticks, etc.) used with larger-scale gaming systems that are configured to provide haptic feedback. Additionally, devices such as cellular telephones and smartphones are capable of providing various alerts to users by way of vibrations. For example, a cellular telephone can alert a user to an incoming telephone call by vibrating. Similarly, a smartphone can alert a user to a scheduled calendar item or provide a user with a reminder for a "to do" list item or calendar appointment. Further, haptic effects can be used to simulate "real world" dynamic events, such as the feel of a bouncing ball in a video game.

SUMMARY

One embodiment is a system that encodes a haptic signal. The system receives one or more key frames. Each key frame has an interpolant value and a haptic effect. The system further generates a haptic effect signal using the one or more key frames. The system further stores the haptic effect signal within a haptic effect file.

Another embodiment is a system that encodes a dynamic haptic effect. The system defines the dynamic haptic effect as including one or more key frames. Each key frame includes an interpolant value and a corresponding haptic effect, where the interpolant value is a value that specifies where an interpolation occurs for the corresponding haptic effect. The system further generates a haptic effect file. The system further stores the dynamic haptic effect within the haptic effect file.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 5 illustrates an example frame list block, according to an embodiment of the invention.

DETAILED DESCRIPTION

Figure 1:
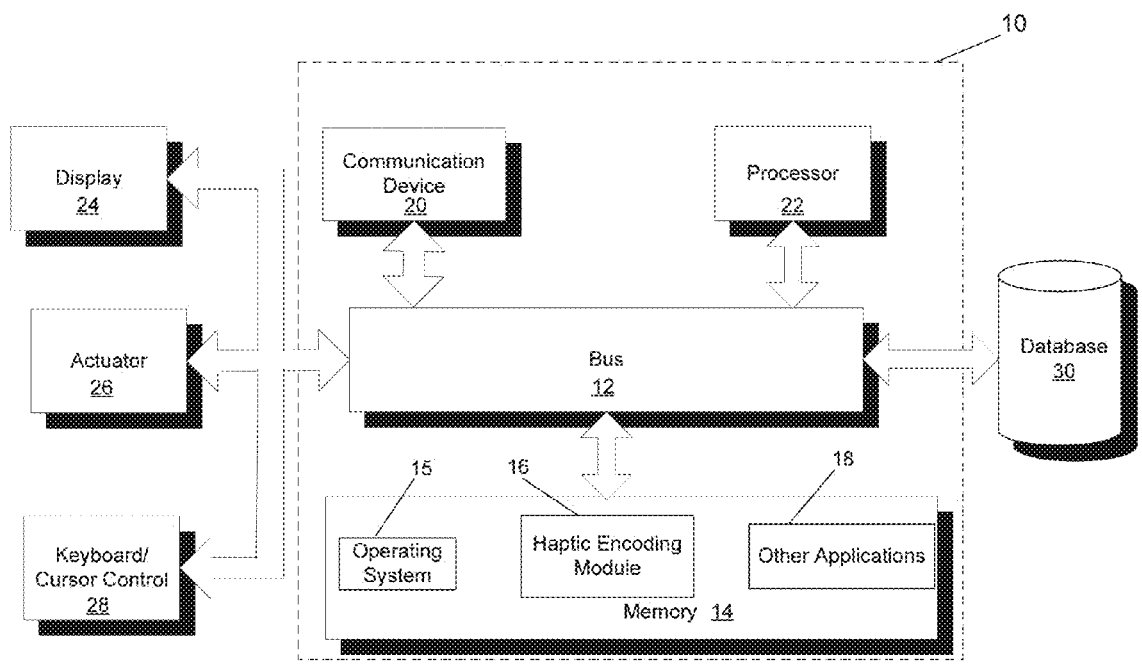
FIG. 1 illustrates a block diagram of a system in accordance with one embodiment of the invention.

As described below, a "dynamic haptic effect" refers to a haptic effect that evolves over time as it responds to one or more input parameters. Dynamic haptic effects are haptic or vibrotactile effects displayed on haptic devices to represent a change in state of a given input signal. The input signal can be a signal captured by sensors on the device with haptic feedback, such as position, acceleration, pressure, orientation, or proximity, or signals captured by other devices and sent to the haptic device to influence the generation of the haptic effect.

A dynamic effect signal can be any type of signal, but does not necessarily have to be complex. For example, a dynamic effect signal may be a simple sine wave that has some property such as phase, frequency, or amplitude that is changing over time or reacting in real time according to a mapping schema which maps an input parameter onto a changing property of the effect signal. An input parameter may be any type of input capable of being provided by a device, and typically may be any type of signal such as a device sensor signal. A device sensor signal may be generated by any means, and typically may be generated by capturing a user gesture with a device. Dynamic effects may be very useful for gesture interfaces, but the use of gestures or sensors are not necessarily required to create a dynamic signal.

One common scenario that does not involve gestures directly is defining the dynamic haptic behavior of an animated widget. For example, when a user scrolls a list, it is not typically the haptification of the gesture that will feel most intuitive, but instead the motion of the widget in response to the gesture. In the scroll list example, gently sliding the list may generate a dynamic haptic feedback that changes according to the speed of the scrolling, but flinging the scroll bar may produce dynamic haptics even after the gesture has ended. This creates the illusion that the widget has some physical properties and it provides the user with information about the state of the widget such as its velocity or whether it is in motion.

A gesture is any movement of the body that conveys meaning or user intent. It will be recognized that simple gestures may be combined to form more complex gestures. For example, bringing a finger into contact with a touch sensitive surface may be referred to as a "finger on" gesture, while removing a finger from a touch sensitive surface may be referred to as a separate "finger off" gesture. If the time between the "finger on" and "finger off" gestures is relatively short, the combined gesture may be referred to as "tapping"; if the time between the "finger on" and "finger off" gestures is relatively long, the combined gesture may be referred to as "long tapping"; if the distance between the two dimensional (x,y) positions of the "finger on" and "finger off" gestures is relatively large, the combined gesture may be referred to as "swiping"; if the distance between the two dimensional (x,y) positions of the "finger on" and "finger off" gestures is relatively small, the combined gesture may be referred to as "smearing", "smudging" or "flicking". Any number of two dimensional or three dimensional simple or complex gestures may be combined in any manner to form any number of other gestures, including, but not limited to, multiple finger contacts, palm or fist contact, or proximity to the device. A gesture can also be any form of hand movement recognized by a device having an accelerometer, gyroscope, or other motion sensor, and converted to electronic signals. Such electronic signals can activate a dynamic effect, such as shaking virtual dice, where the sensor captures the user intent that generates a dynamic effect.

One embodiment is a system that can encode one or more dynamic haptic effects on a disk, memory, or any computer-readable storage medium. One type of a dynamic haptic effect is a haptic effect that can be generated by interpolating a first haptic effect and a second haptic effect based on a dynamic value that is a value between a first interpolant value and a second interpolant value. A dynamic value that is equal to either the first interpolant value or the second interpolant value is considered "between the first interpolant value and the second interpolant value." More specifically, a value for each parameter of the dynamic haptic effect is calculated by interpolating a value of the parameter of the first haptic effect with a value of the parameter of the second haptic effect, using an interpolation function. The interpolation of each parameter value of the dynamic haptic effect can be based upon where the dynamic value falls between the first interpolant value and the second interpolant value. Dynamic haptic effects are further described in U.S. patent application Ser. No. 13/546,351, filed on Jul. 11, 2012, entitled "GENERATING HAPTIC EFFECTS FOR DYNAMIC EVENTS" (the contents of which are herein incorporated by reference). The dynamic haptic effect can be encoded using a haptic effect signal, where the haptic effect signal is a representation of the dynamic haptic effect. The haptic effect signal can be persisted on a disk, memory, or any computer-readable storage medium.

According to the embodiment, the system can define each dynamic haptic effect as one or more key frames, where each key frame can include a haptic effect, and a corresponding value. Thus, the system can create one or more dynamic haptic effect definitions. The system can store the one or more dynamic haptic effect definitions within a haptic effect file. The system can further retrieve the one or more dynamic haptic effect definitions from the haptic effect file. The system can further receive a dynamic value, and, based on the received dynamic value, interpret the one or more dynamic haptic effect definitions in order to generate the one or more dynamic haptic effects.

According to another embodiment, the system can receive one or more key frames, where each key frame can include a haptic effect and a value. The system can generate a haptic effect signal using the one or more key frames. The system can further store the haptic effect signal within a haptic effect file. The system can further retrieve the haptic effect signal form the haptic effect file. The system can further apply a drive signal to a haptic output device according to the haptic effect signal. The system can further generate the drive signal using the haptic output device. In this embodiment, the one or more key frames can comprise the one or more input parameters of a dynamic haptic effect produced by the haptic effect signal.

FIG. 1 illustrates a block diagram of a system 10 in accordance with one embodiment of the invention. In one embodiment, system 10 is part of a device, and system 10 provides a haptic encoding functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic encoding module 16 that encodes a dynamic haptic effect, as disclosed in more detail below. In certain embodiments, haptic encoding module 16 can comprise a plurality of modules, where each individual module provides specific individual functionality for encoding a dynamic haptic effect. System 10 will typically include one or more additional application modules 18 to include additional functionality, such as the Integrator™ application by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touchscreen, configured to send and receive signals from processor 22, and may be a multi-touch touchscreen. Processor 22 may be further coupled to a keyboard or cursor control 28 that allows a user to interact with system 10, such as a mouse or a stylus.

System 10, in one embodiment, further includes an actuator 26. Processor 22 may transmit a haptic signal associated with a generated haptic effect to actuator 26, which in turn outputs haptic effects such as vibrotactile haptic effects. Actuator 26 includes an actuator drive circuit. Actuator 26 may be, for example, an electric motor, an electro-magnetic actuator, a voice coil, a shape memory alloy, an electroactive polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). In other embodiments, a separate device from system 10 includes an actuator that generates the haptic effects, and system 10 sends generated haptic effect signals to that device through communication device 20. Actuator 26 is an example of a haptic output device, where a haptic output device is a device configured to output haptic effects, such as vibrotactile haptic effects, in response to a drive signal.

System 10 can further be operatively coupled to a database 30, where database 30 can be configured to store data used by modules 16 and 18. Database 30 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
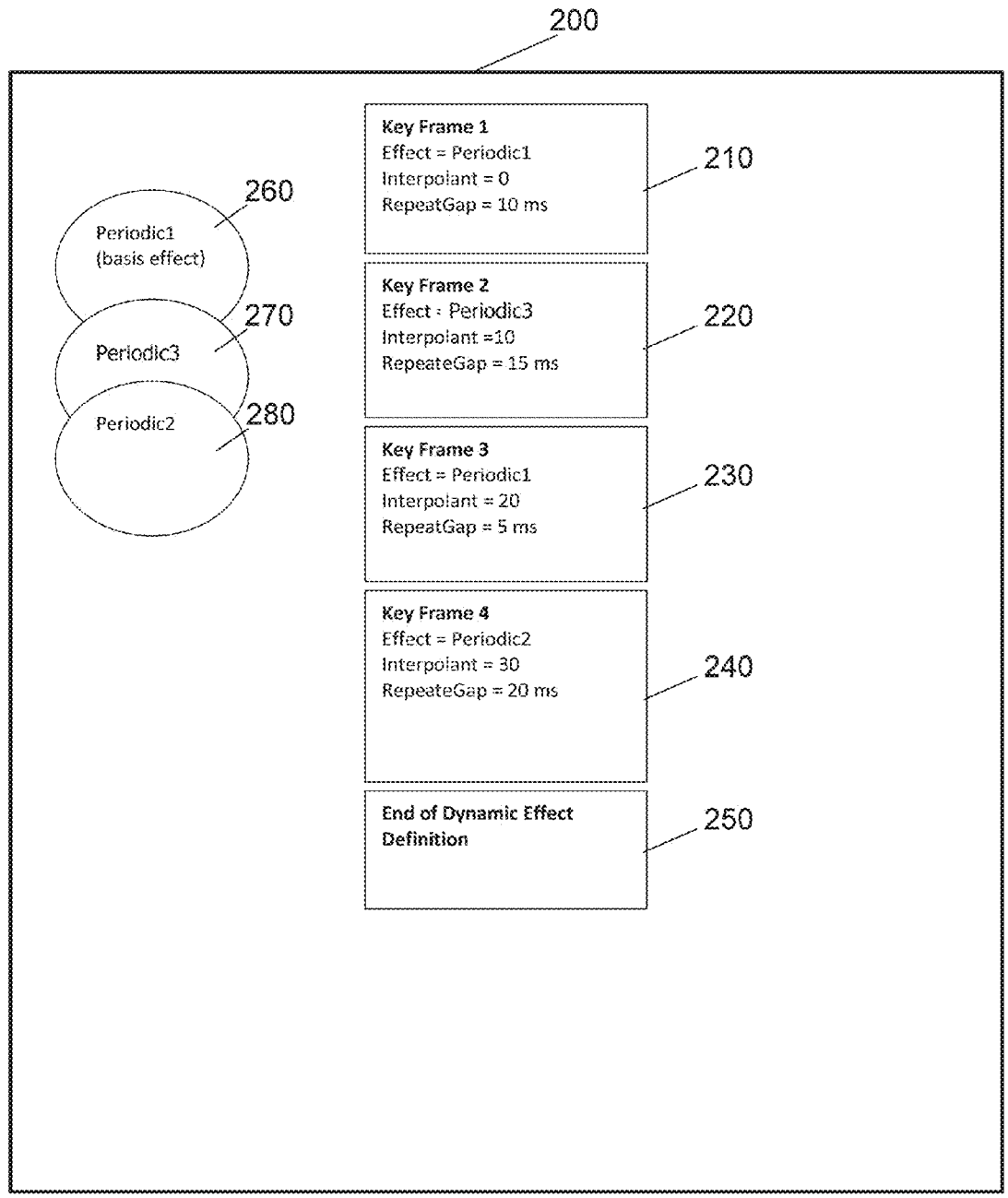
FIG. 2 illustrates an example dynamic haptic effect definition, according to an embodiment of the invention.

FIG. 2 illustrates an example dynamic haptic effect definition 200, according to an embodiment of the invention. According to an embodiment, a dynamic haptic effect can be defined to include one or more key frames. A key frame is a representation of a basis haptic effect that can be used to define the dynamic haptic effect. Also according to an embodiment, a haptic effect signal can be generated using the one or more key frames, where the haptic effect signal is a signal that can store one or more key frames. By generating the haptic effect signal using the one or more key frames, the one or more key frames are generated, and subsequently stored within the haptic effect signal. The haptic effect signal can be stored within, and retrieved from, a haptic effect file.

A key frame can include a basis haptic effect definition. A basis haptic effect is a haptic effect that can include one or more parameters that define the characteristics of the haptic effect (more specifically, the characteristics of the kinesthetic feedback and/or tactile feedback produced by the haptic effect), where the haptic effect can be a vibratory haptic effect, for example. Examples of the one or more parameters can include a magnitude parameter, a frequency parameter, and a duration parameter. Examples of basis haptic effects can include a "MagSweep haptic effect", and a "periodic haptic effect." A MagSweep haptic effect is a haptic effect that produces kinesthetic feedback and/or tactile feedback (such as a vibration). A periodic haptic effect is a haptic effect that produces a repeating kinesthetic feedback and/or tactile feedback (such as a vibration pattern). An example of a repeating pattern includes repeating pulses of certain shapes, such as sinusoidal, rectangular, triangular, sawtooth-up and sawtooth-down.

A key frame can include an interpolant value. An interpolant value is a value that specifies where a current interpolation is occurring. In an embodiment, an interpolant value can be an integer value from a minimum value to a maximum value. As an example, an interpolant value can be from 0 to 10,000. However, this is merely an example, and an interpolant value can be any value from any minimum value to any maximum value. For example, in other embodiments, an interpolant value can be a fixed-point or floating-point numeric value. An interpolant value can be stored within one or more bits.

A key frame can optionally also include a repeat gap value. A repeat gap value is a value that indicates a time period between two consecutive instances of a basis haptic effect when the basis haptic effect is played consecutively. In one embodiment, a repeat gap can indicate a number of milliseconds between two consecutive instances of the basis haptic effect.

In the illustrated embodiment, dynamic haptic effect definition 200 includes four key frames, key frames 210, 220, 230, and 240. However, this is merely an example embodiment, and in alternate embodiments, a dynamic haptic effect definition can include any number of key frames. Key frame 210 includes a basis haptic effect reference of "Periodic1," an interpolant value of "0," and a repeat gap value of "10 ms." The basis haptic effect reference "Periodic1" refers to basis haptic effect 260, which is also included within dynamic haptic effect definition 200. Thus, key frame 210 defines basis haptic effect 260 as the basis haptic effect for the interpolant value of "0." Key frame 210 further indicates that when basis haptic effect 260 is played consecutively, there is a time period of 10 ms between each consecutive instance of basis haptic effect 260. Similarly, key frame 220 includes a basis haptic effect reference of "Periodic3," an interpolant value of "10," and a repeat gap value of "15 ms." The basis haptic effect reference "Periodic3" refers to basis haptic effect 270, which is also included within dynamic haptic effect definition 200. Thus, key frame 220 defines basis haptic effect 270 as the basis haptic effect for the interpolant value of "10." Key frame 220 further indicates that when basis haptic effect 270 is played consecutively, there is a time period of 15 ms between each consecutive instance of basis haptic effect 270.

Likewise, key frame 230 includes a basis haptic effect reference of "Periodic1," an interpolant value of "20," and a repeat gap value of "5 ms." As previously described, the basis haptic effect reference "Periodic1" refers to basis haptic effect 260, which is also included within dynamic haptic effect definition 200. Thus, key frame 230 defines basis haptic effect 260 as the basis haptic effect for the interpolant value of "20." This illustrates that a basis haptic effect can be defined as a basis haptic effect for more than one interpolant value. Key frame 230 further indicates that when basis haptic effect 260 is played consecutively, there is a time period of 5 ms between each consecutive instance of basis haptic effect 260. Similarly, key frame 240 includes a basis haptic effect reference of "Periodic2," an interpolant value of "30," and a repeat gap value of "20 ms." The basis haptic effect reference "Periodic2" refers to basis haptic effect 280, which is also included within dynamic haptic effect definition 200. Thus, key frame 240 defines basis haptic effect 280 as the basis haptic effect for the interpolant value of "30." Key frame 240 further indicates that when basis haptic effect 280 is played consecutively, there is a time period of 20 ms between each consecutive instance of basis haptic effect 280.

According to an embodiment, a dynamic haptic effect can be defined to also include an indication of an end of the dynamic haptic effect. The indication of the end of the dynamic haptic effect indicates that the dynamic haptic effect does not include any additional key frames. As described below in greater detail, a device that interprets a dynamic haptic effect definition can be configured to interpret the contents of the dynamic haptic effect definition sequentially. Thus, the indication can indicate to a device the end of the dynamic haptic effect definition. In one embodiment, the indication of an end of the dynamic haptic effect can be considered an additional key frame. In the illustrated embodiment, dynamic haptic effect definition 200 includes end of dynamic haptic effect definition 250 which indicates the end of dynamic haptic effect definition 200.

Figure 3:
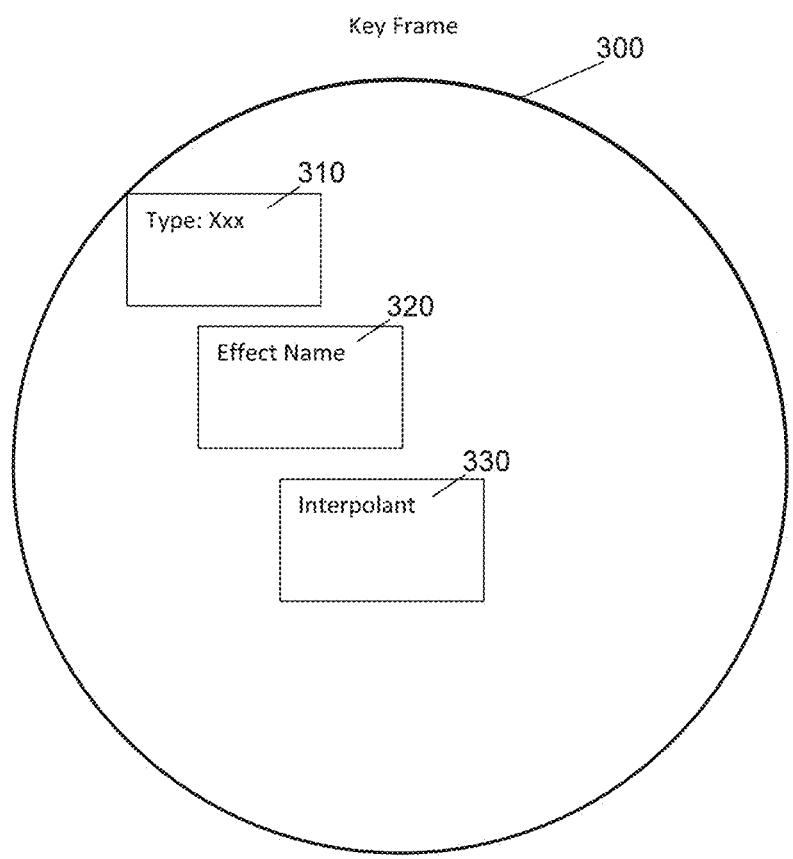
FIG. 3 illustrates an example key frame definition, according to an embodiment of the invention.

FIG. 3 illustrates an example key frame definition 300, according to an embodiment of the invention. As previously described, a dynamic haptic effect definition includes one or more key frames. According to the embodiment, a key frame definition can include one or more properties. Each property of the one or more properties can include a value.

A key frame definition can include a type property. In one embodiment, the type property is the first property of the key frame definition. The type property can indicate whether the key frame is a key frame that contains a basis haptic effect for a dynamic haptic effect definition or a key frame that indicates an end of the dynamic haptic effect definition. In the illustrated embodiment, key frame definition 300 includes type property 310 which indicates the type of key frame defined by key frame definition 300.

A key frame definition can also include a basis haptic effect property. The basis haptic effect property can store a reference to a basis haptic effect for the key frame. In the illustrated embodiment, key frame definition 300 includes basis haptic effect property 320 (identified in FIG. 3 as "effect name") which includes a reference to a basis haptic effect for the key frame defined by key frame definition 300.

A key frame definition can also include an interpolant property. The interpolant property can store an interpolant value, where the interpolant value specifies where a current interpolation is occurring. In an embodiment, an interpolant value can be an integer value from a minimum value to a maximum value. As an example, an interpolant value can be from 0 to 10,000. The interpolant value can be stored in one or more bits. In the illustrated embodiment, key frame definition 300 includes interpolant property 330 which includes an interpolant value for the key frame defined by key frame definition 300.

A key frame definition can also optionally include a repeat gap property (not illustrated in FIG. 3). The repeat gap property can store a repeat gap value which indicates a time period between two consecutive instances of a basis haptic effect for a key frame when the basis haptic effect is played consecutively. In one embodiment, a repeat gap can indicate a number of milliseconds between two consecutive instances of the basis haptic effect for the key frame.

In one embodiment, a haptic effect file is a computer file configured to store one or more dynamic haptic effects, where the haptic effect file can be persisted on a disk, memory, or any computer-readable storage medium. According to the embodiment, a haptic effect file can store one or more dynamic haptic effect definitions using a basis haptic effect storage block and a frame list block. A basis haptic effect storage block can be used to store one or more basis haptic effects that a dynamic haptic effect can reference. A frame list block can be used to store one or more key frame definitions that correspond to a dynamic haptic effect definition. A basis haptic effect storage block and a frame list block are now described in greater detail.

Figure 4:
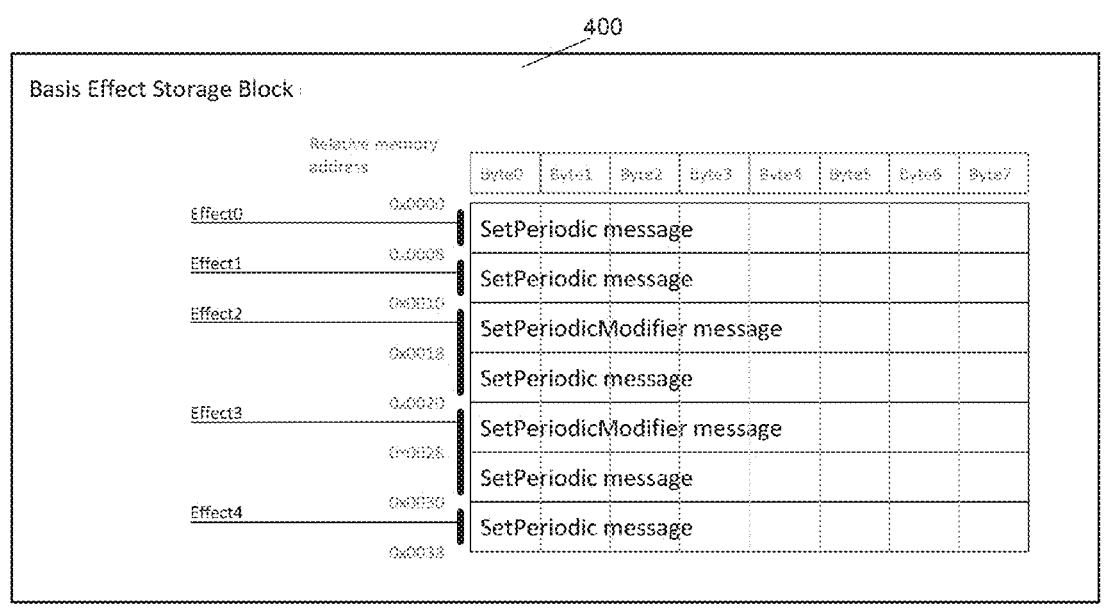
FIG. 4 illustrates an example basis haptic effect storage block, according to an embodiment of the invention.

FIG. 4 illustrates an example basis haptic effect storage block 400, according to an embodiment of the invention. As previously described, a dynamic haptic effect definition can include one or more basis haptic effects, where at least one stored basis haptic effect is referenced by at least one key frame of the dynamic haptic definition. In one embodiment, the one or more basis haptic effects can be stored within a basis haptic effect storage block, such as basis haptic effect storage block 400, where the basis haptic effect storage block is stored within the dynamic haptic effect definition.

According to the embodiment, one or more basis haptic effects can be stored as message streams within basis haptic effect storage block 400. An example messaging format is a "codename z2" protocol messaging format. In the illustrated embodiment, a basic haptic effect is defined by a SetPeriodic message optionally preceded by a SetPeriodicModifier message. Thus, when a basis haptic effect has an associated envelope, a SetPeriodicModifier message can appear before a SetPeriodic message in the block. Otherwise, only a SetPeriodic message can appear in the block. Thus, according to the embodiment, a basis haptic effect, as stored in a basis haptic effect storage block (such as basis haptic effect storage block 400 of FIG. 4) can either take up: (a) 8 bytes of memory in a single SetPeriodic message (assuming a default envelope); or (b) 16 bytes of memory in a first SetPeriodicModifier message followed by a subsequent SetPeriodic message.

According to the embodiment, a basis haptic effect storage block (such as basis haptic effect storage block 400 of FIG. 4) can include one or more basis haptic effect definitions, where each basis haptic effect definition corresponds to a basis haptic effect. The one or more basis haptic effect definitions can be sequential within the basis haptic effect storage block, and can each be associated with an index.

In the illustrated embodiment, basis haptic effect storage block 400 includes five basis haptic effects: Effect0, Effect1, Effect2, Effect3, and Effect4. Effect0 is the first basis haptic effect located in basis haptic effect storage block 400, Effect1 is the second basis haptic effect located in basis haptic effect storage block 400, Effect2 is the third basis haptic effect located in basis haptic effect storage block 400, Effect3 is the fourth basis haptic effect located in basis haptic effect storage block 400, and Effect4 is the fifth basis haptic effect located in basis haptic effect storage block 400. Each of the five basis haptic effects (i.e., Effect0, Effect1, Effect2, Effect3, and Effect4) includes a basic haptic definition that either includes a single SetPeriodic message or a combination of a SetPeriodicModifier message and a SetPeriodic message.

FIG. 5 illustrates an example frame list block 500, according to an embodiment of the invention. As previously described, a dynamic haptic effect definition can include one or more key frames, where each key frame can reference a basis haptic effect. In one embodiment, the one or more key frames can be stored within a frame list block, such as frame list block 500, where the frame list block is stored within the dynamic haptic effect definition.

According to the embodiment, a frame list block, such as frame list block 500, includes a type property for a first key frame definition. Depending on the type property, the frame list block further includes one or more properties associated with the first key frame definition, such as a basis haptic effect property, an interpolant property, a repeat gap property, or a combination therein. The frame list block further includes a type property for a second key frame definition, which indicates the end of the first key frame definition. Depending on the type property, the frame list block further includes one or more properties associated with the second key frame definition, such as a basis haptic effect property, an interpolant property, a repeat gap property, or a combination therein. This continues for each key frame definition of the frame list block. The frame list block further includes a type property that indicates an end of a dynamic haptic effect. According to the embodiment, the key frame definitions of the frame list block are in sequential order. In other words, the events of the frame list block are processed in the order in which they are located within the frame list block.

According to the embodiment, one or more properties of the frame list block can be encoded using a single header byte, followed by optional data bytes. An example encoding scheme of one or more properties of a frame list block is as follows:

Key Frame Type Property

| Byte # | Bits7-0 | Meaning |
|---|---|---|
| 0 | 0xC1 | Type = Key Frame. No data associated with this property. |

End of Dynamic Haptic Effect Type Property

| Byte # | Bits7-0 | Meaning |
|---|---|---|
| 0 | 0xCF | Type = End of Dynamic Haptic Effect. No data associated with this property. |

EffectNameAsOffSetU8 Property

| Byte # | Bits7-0 | Meaning |
|---|---|---|
| 0 | 0xE0 | EffectName is specified as a memory offset from the base of the basis haptic effect storage block. |
| 1 | OFFSET11_3 | The offset from the basis of the basis haptic effect storage block where the 8 or 16-byte haptic effect definition can be found. The OFFSET11_3 value can be multiplied by 8 to obtain the actual address offset |

InterpolantU16 Property

| Byte # | Bits7-0 | Meaning |
|---|---|---|
| 0 | 0xE6 | Interpolant is stored as a 16-bit unsigned integer |
| 1 | TIME15_8 | The MSByte of the TimeOffset value |
| 2 | TIME7_0 | The LSByte of the TimeOffset value |

RepeatGapU16 Property

| Byte # | Bits7-0 | Meaning |
|---|---|---|
| 0 | 0xE2 | Repeat gap value is stored in an un-signed 16-bit value, in milliseconds |
| 1 | PERIOD15_8 | The MSByte of the value |
| 2 | PERIOD7_0 | The LSByte of the value |

According to the embodiment, the key frame type property and the end of dynamic haptic effect type property correspond to a type property of a key frame definition, the EffectNameAsOffSetU8 property corresponds to a basis haptic effect property of the key frame definition, the InterpolantU16 property corresponds to an interpolant property of the key frame definition, and the RepeatGapU16 property corresponds to a repeat gap property of the key frame definition.

In the illustrated embodiment, frame list block 500 includes key frame definitions 510, 520, and 530. Key frame definitions 510 and 520 are each a definition for a basis haptic effect key frame. Key frame definition 530 is an indication of an end of the dynamic haptic effect stored within frame list block. The left column of frame list block 500 indicates a byte stream that is found in memory for each of key frame definitions 510, 520, and 530. The right column of frame list block indicates a meaning of each property for each of key frame definitions 510, 520, and 530.

According to the illustrated embodiment, key frame definition 510 includes a key frame type property ("KeyFrame Event" as illustrated in FIG. 5) that indicates a start of key frame definition 510. Key frame definition 510 further includes a basis haptic effect property ("EffectNameAsOffsetU8" as illustrated in FIG. 5) that stores a reference to a basis haptic effect for key frame definition 510, where the basis haptic effect property includes a header byte and an offset byte. Key frame definition 510 further includes an interpolant property ("InterpolantU16" as illustrated in FIG. 5) that stores an interpolant value specifying where a current interpolation is occurring, where the interpolant property includes a header byte, a most significant bit ("MSB"), and a least significant bit ("LSB"). Key frame definition 510 further includes a repeat gap property ("RepeatGapU16" as illustrated in FIG. 5) that stores a repeat gap value which indicates a time period between two consecutive instances of a basis haptic effect for a key frame, where the repeat gap property includes a header byte, an MSB, and an LSB.

Further, key frame definition 520 also includes a key frame type property ("KeyFrame Event" as illustrated in FIG. 5) that indicates a start of key frame definition 520. Key frame definition 520 further includes a basis haptic effect property ("EffectNameAsOffsetU16" as illustrated in FIG. 5) that stores a reference to a basis haptic effect for key frame definition 520, where the basis haptic effect property includes a header byte, a basis haptic effect definition MSB, and a basis haptic effect definition LSB. Key frame definition 520 further includes an interpolant property ("InterpolantU16" as illustrated in FIG. 5) that stores an interpolant value specifying where a current interpolation is occurring, where the interpolant property includes a header byte, an MSB, and an LSB. As illustrated in FIG. 5, in contrast to key frame definition 510, key frame definition 520 does not include a repeat gap property. Finally, key frame definition 530 includes an end of dynamic haptic effect type property ("EndofDynamicHapticEffect" as illustrated in FIG. 5) that indicates an end of the dynamic haptic effect definition.

According to an embodiment, a dynamic haptic effect definition (such as dynamic haptic effect definition 200 of FIG. 2) can be stored within a haptic effect file. As previously described, a haptic effect file is a computer file configured to store one or more dynamic haptic effects. The dynamic haptic effect definition can be stored within the haptic effect file, and the haptic effect file can be persisted within a computer-readable medium, such as a disk or memory. The dynamic haptic effect definition can subsequently be retrieved from the haptic effect and interpreted. Based on the interpretation of the dynamic haptic effect definition, a dynamic haptic effect can be generated by interpolating a first haptic effect and a second haptic effect based on a dynamic value that is a value between a first interpolant value and a second interpolant value. More specifically, a value for each parameter of the dynamic haptic effect can be calculated by interpolating a value of the parameter of the first haptic effect with a value of the parameter of the second haptic effect, using an interpolation function. The interpolation of each parameter value of the dynamic haptic effect can be based upon where the dynamic value falls between the first interpolant value and the second interpolant value. For example, where a first interpolant value is "0" and a second interpolant value is "100," a dynamic value of "50" can cause a first haptic effect associated with the first interpolant value of "0" to be interpolated with a second haptic effect associated with the second interpolant value of "100" to create the dynamic haptic effect. Each parameter value of the first haptic effect can be interpolated with a parameter value of the second value based on an interpolation function, so that the parameter values of the dynamic haptic effect are based both on the parameter values of the first haptic effect and the parameter values of the second haptic effect. Additional details regarding generating dynamic haptic effects are further described in U.S. patent application Ser. No. 13/546,351, filed on Jul. 11, 2012, entitled "GENERATING HAPTIC EFFECTS FOR DYNAMIC EVENTS."

Also according to an embodiment, a dynamic haptic effect definition (such as dynamic haptic effect definition 200 of FIG. 2) can be used to generate a haptic effect signal, where the haptic effect signal can be stored within a haptic effect file. The haptic effect signal can subsequently be retrieved from the haptic effect file. Further, a drive signal can be applied to a haptic output device according to the haptic effect signal. The drive signal can be further generated using the haptic output device.

The haptic effect file can have one of many different formats. In certain embodiments, the haptic effect file can have an extensible markup language ("XML") format. In certain other embodiments, the haptic effect file can have a binary format.

One example of a haptic effect file that has an XML format is an Immersion Vibration Source ("IVS") haptic effect file. An example IVS haptic effect file that includes a dynamic haptic effect definition is provided below:

```
<interpolated-effect name="interpolated-effect-name">
  <key-frame interpolant="0" effect="basis-effect-0-name"
    repeat-gap="0" />
  <key-frame interpolant="0.5" effect="basis-effect-1-name"
    repeat-gap="15" />
  <key-frame interpolant="1" effect="basis-effect-2-name" />
</interpolated-effect>
```

In the example IVS haptic effect file provided above, the first tag, <interpolated-effect name> identifies a name of the dynamic haptic effect that is being stored within the IVS haptic effect file. The next three tags in the example IVS haptic effect file are a series of key frame tags, where each key frame tag represents a key frame of the dynamic haptic effect. Each key frame tag can include two parameters, a key-frame interpolant parameter and an effect parameter. A key-frame interpolant parameter represents an interpolant value for the key frame. An effect parameter represents a name of a basis haptic effect for the key frame. Further, each key frame tag can optionally include a third parameter, a repeat gap parameter. A repeat gap parameter represents a repeat gap for a key frame. If the key frame tag does not include a repeat gap parameter, then the key frame does not include a repeat gap, which means that the basis haptic effect for the key frame is not repeated. In the example IVS haptic effect file, the first key frame tag includes a key-frame interpolant parameter with a value of "0," an effect parameter with a value of "basis-effect-0-name," and a repeat gap parameter with a value of "0." The second key frame tag includes a key-frame interpolant parameter with a value of "0.5," an effect parameter with a value of "basis-effect-1-name," and a repeat gap parameter with a value of "15." The third key frame tag includes a key-frame interpolant parameter with a value of "1," and an effect parameter with a value of "basis-effect-2-name," and does not include a repeat gap parameter. The subsequent tag, "</interpolated-effect>," identifies the end of the dynamic haptic effect that is being stored within the IVS haptic effect file.

According to an embodiment, a device can read an IVS haptic effect file, such as the example IVS haptic effect file provided above, interpret the dynamic haptic effect definition stored within the IVS haptic effect file, and use the values stored within the IVS haptic effect file to generate the dynamic haptic effect. For example, the device can provide an interpolant value at runtime, and the device can interpret the dynamic haptic effect definition stored within the IVS haptic effect file, and determine which key frames the interpolant value lies between. The device can then interpolate between the basis haptic effects of the two key frames to generate the dynamic haptic effect.

Another example of a haptic effect file that has a binary format is an Immersion Vibration Target ("IVT") haptic effect file. An example IVT haptic effect file that includes a dynamic haptic effect definition is provided below.

```
0xC1, // KeyFrame event for KeyFrame 0
0xE0, // EffectIndexU8 event property
0, // Use Basis effect 0
0xE6, // InterpolantU8 event property
0, // Interpolant value for KeyFrame 0.
0xE2, // TimeOffsetMs16 event property. Note: this is optional
50, // Repeat gap for KeyFrame 0, LSB
0, // Repeat gap for KeyFrame 0, MSB
0xC1, // KeyFrame event for KeyFrame 1
0xE0, // EffectIndexU8 event property
1, // Use Basis effect 1
0xE6, // InterpolantU8 event property
100, // Interpolant value for KeyFrame 1.
0xE2, // TimeOffsetMs16 event property. Note: this is optional
150, // Repeat gap for KeyFrame 1, LSB
0, // Repeat gap for KeyFrame 1, MSB
0xCF // End event for LERP effect
```

The example IVT haptic effect file provided above includes two key frame definitions, where each key frame definition is identified by the hexadecimal number "0xC1." According to an embodiment, a hexadecimal value, such as "0xCy," where 'y' is any non-zero hexadecimal digit, can identify a start of a key frame that is being stored within the IVT haptic effect file. Further, according to the embodiment, if the hexadecimal value "0xCy," is the first such hexadecimal value within the IVT haptic effect file, the hexadecimal value can also indicate a start of a dynamic haptic effect that is being stored within the IVT haptic effect file, where the dynamic haptic effect includes one or more key frames. In the example IVT haptic effect file provided above, the first instance of "0xC1" indicates the start of the stored dynamic haptic effect, and also indicates the start of the first key frame, "KeyFrame 1," within the stored dynamic haptic effect. Also in the example IVT haptic effect file, the second instance of "0xC1" indicates the start of the second key frame, "KeyFrame 2," within the stored dynamic haptic effect.

For each key frame, the example IVT haptic effect file further includes data that defines the key frame. For example, according to an embodiment, the example IVT haptic effect file further includes a hexadecimal value, such as "0xE0" or "0xE1" that identifies a basis haptic effect property for the key frame, and a value for the basis haptic effect property. In the example IVT haptic effect file, for the first key frame, the instance of "0xE0" identifies a basis haptic effect property for the first key frame, and the value of "0" identifies a first basis haptic effect for the basis haptic effect property of the first key frame. Likewise, for the second key frame, the instance of "0xE0" identifies a basis haptic effect property for the second key frame, and the value of "1" identifies a second basis haptic effect for the basis haptic effect property of the second key frame.

As part of the data that defines the key frame, according to the embodiment, the example IVT haptic effect file further includes a hexadecimal value, such as "0xE6" that identifies an interpolant property for the key frame, and a value for the interpolant property. In the example IVT haptic effect file, for the first key frame, the instance of "0xE6" identifies an interpolant property for the first key frame, and the value of "0" identifies an interpolant value for the interpolant property of the first key frame. Likewise, for the second key frame, the instance of "0xE6" identifies an interpolant property for the second key frame, and the value of "100" identifies an interpolant value for the interpolant property of the second key frame.

As part of the data that defines the key frame, according to the embodiment, the example IVT haptic effect file further optionally includes a hexadecimal value, such as "0xE2" that identifies a repeat gap property for the key frame, and one or more values for the repeat gap property. In the example IVT haptic effect file, for the first key frame, the instance of "0xE2" identifies a repeat gap property for the first key frame, the value of "50" identifies a "LSB" repeat gap value for the repeat gap property of the first key frame, and the value of "0" identifies a "MSB" repeat gap value for the repeat gap property of the first key frame. Likewise, for the second key frame, the instance of "0xE2" identifies a repeat gap property for the second key frame, the value of "150" identifies an LSB repeat gap value for the repeat gap property of the second key frame, and the value of "0" identifies an MSB repeat gap value for the repeat gap property of the second key frame.

The example IVT haptic effect file further includes a hexadecimal value, such as "0xCF" that identifies the end of the dynamic haptic effect that is being stored within the IVT haptic effect file. In the example IVT haptic effect file, the instance of "0XCF" identifies the end of the stored dynamic haptic effect.

According to an embodiment, a device can read an IVT haptic effect file, such as the example IVT haptic effect file provided above, interpret the dynamic haptic effect definition stored within the IVT haptic effect file, and use the values stored within the IVT haptic effect file to generate the dynamic haptic effect. For example, the device can provide an interpolant value at runtime, and the device can interpret the dynamic haptic effect definition stored within the IVT haptic effect file, and determine which key frames the interpolant value lies between. The device can then interpolate between the basis haptic effects of the two key frames to generate the dynamic haptic effect.

In one embodiment, an IVT haptic effect file can include definitions of other haptic effects, such as basis haptic effects, in addition to definitions of dynamic haptic effects. For example, an IVT haptic effect file can include MagSweep haptic effect definitions, periodic haptic effect definitions, or other types of basis haptic effect definitions, such as a "waveform haptic effect" definition. A "waveform haptic effect" is a haptic effect that produces feedback based on a specific signal that results in more precisely controlled feedback. According to the embodiment, a hexadecimal value can identify a start of a dynamic haptic effect, as compared to a start of a basis haptic effect. Thus, when a device reads an IVT haptic effect file, the device can distinguish a dynamic haptic effect definition from a basis haptic effect definition.

In an example embodiment, a hexadecimal value, such as "0xF1," "0xF2," or "0xFF," can identify a start of a "timeline haptic effect." A "timeline haptic effect" can comprise one or more basic haptic effects that are scheduled over time. Further, a hexadecimal value, such as "0x20," "0x30," "0x40," and "0x50," can identify a start of a basis haptic effect, such as, for example, a MagSweep haptic effect, a periodic haptic effect, or a waveform haptic effect. And further, as previously described, a hexadecimal value, such as "0xCy," where 'y' is any non-zero hexadecimal digit can identify a start of a dynamic haptic effect. Thus, when a device reads an IVT haptic effect file, the device can read a hexadecimal value stored within the IVT haptic effect file, and determine whether the defined haptic effect is a dynamic haptic effect, or some other haptic effect. Example pseudocode for determining whether a defined haptic effect is a dynamic haptic effect, or some other haptic effect is provided below.

```
if (0xF0 == (*p & 0xF0)) {
    // We have a Timeline effect
} else if (0xC0 == (*p & 0xC0)) {
    // We have a Dynamic effect
} else if (0 == (*p & 0x0F)) {
    // We have a Basis effect
}
```

However, this example pseudocode is merely an example of code that can implement the aforementioned functionality, and code that implements the functionality could be in other formats, and still be within the scope of the invention. Further, while two example formats of a haptic effect file have been described (i.e., an IVS haptic effect file, and an IVT haptic effect file), a haptic effect file could be in a different format, and still be within the scope of the invention.

Figure 6:
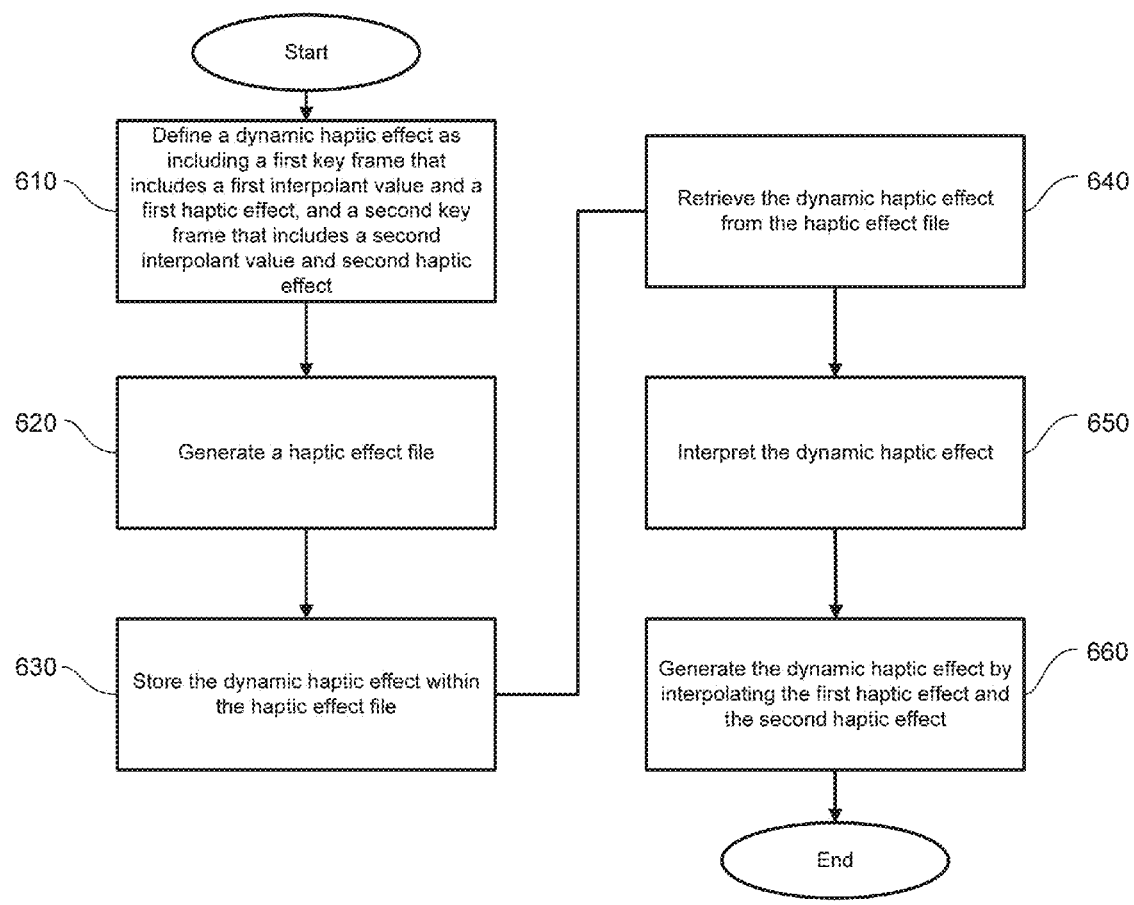
FIG. 6 illustrates a flow diagram of the functionality of a haptic encoding module, according to one embodiment of the invention.
Figure 7:
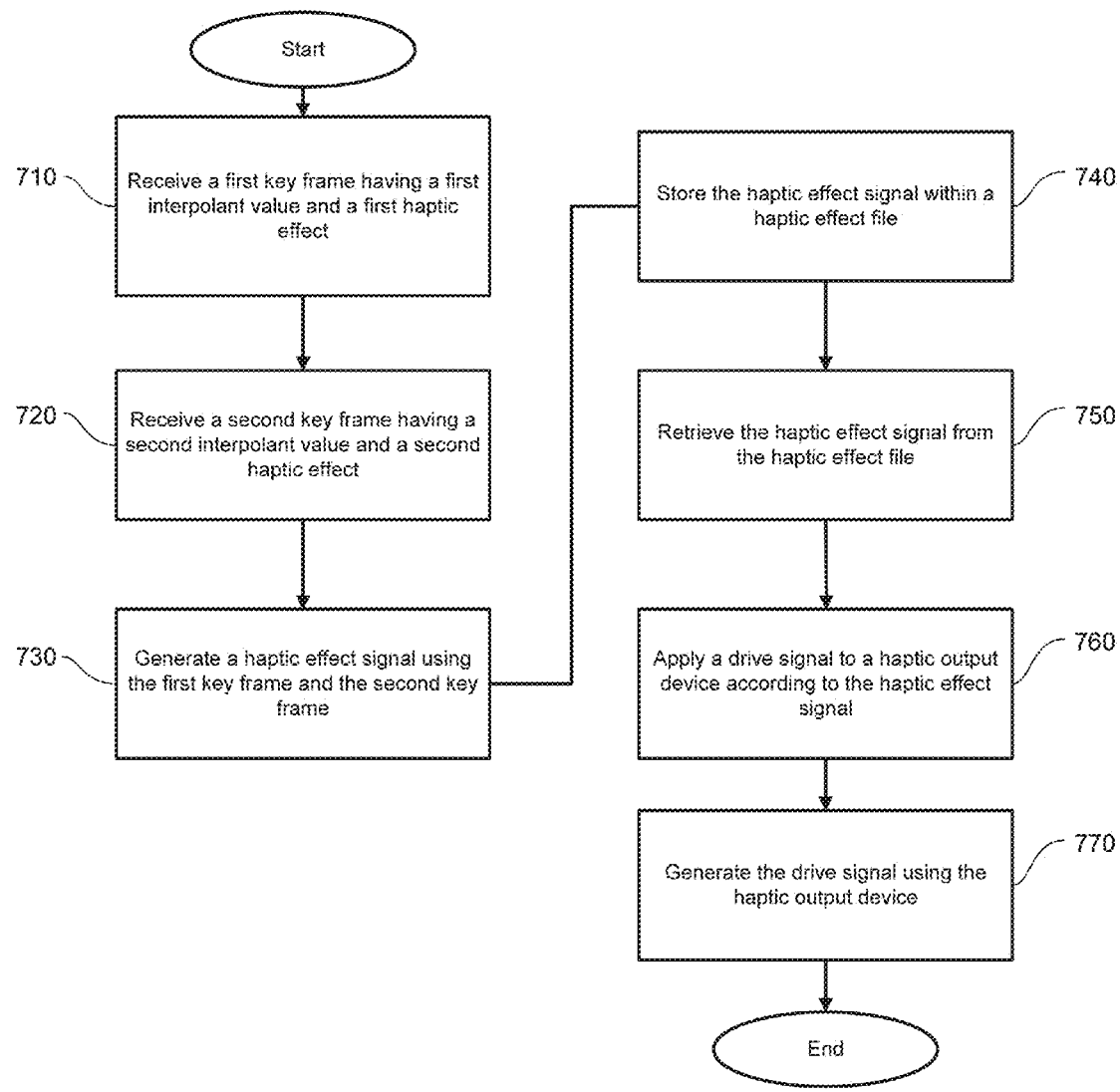
FIG. 7 illustrates a flow diagram of the functionality of a haptic encoding module, according to another embodiment of the invention.

FIG. 6 illustrates a flow diagram of the functionality of a haptic encoding module (such as haptic encoding module 16 of FIG. 1), according to one embodiment of the invention. In one embodiment, the functionality of FIG. 6, as well as the functionality of FIG. 7, are each implemented by software stored in memory or another computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in alternate embodiments, each functionality may be performed by hardware using analog components.

The flow begins and proceeds to 610. At 610, a dynamic haptic effect is defined as including a first key frame and a second key frame. The first key frame includes a first interpolant value and a corresponding first haptic effect. The second key frame includes a second interpolant value and a corresponding second haptic effect. The first interpolant value can be a value that specifies where an interpolation occurs for the corresponding first haptic effect, and the second interpolant value can be a value that specifies where an interpolation occurs for the corresponding second haptic effect. The first key frame and the second key frame can each include a repeat gap value. The first haptic effect and the second haptic effect can each be a vibratory haptic effect, and can each include a plurality of parameters. The plurality of parameters can include a magnitude parameter, a frequency parameter, and a duration parameter. The dynamic haptic effect can be further defined to include an indication of an end of the dynamic haptic effect. The dynamic haptic effect can be further defined to include a haptic effect storage block, where the first haptic effect and the second haptic effect can be stored within the haptic effect storage block. The dynamic haptic effect can include additional key frames. In the illustrated embodiment, a dynamic haptic effect can be defined as including two key frames, where each key frame includes a haptic effect. However, this is only an example embodiment, and in alternate embodiments, a dynamic haptic effect can be defined as including three or more key frames, where each key frame includes a haptic effect. The flow proceeds to 620.

At 620, a haptic effect file is generated. A format of the haptic effect file can be a binary format. Alternatively, the format of the haptic effect file can be an XML format. The flow proceeds to 630.

At 630, the dynamic haptic effect is stored within the haptic effect file. The dynamic haptic effect can be stored along with one or more other haptic effects within the haptic effect file. At least one of the other haptic effects can be another dynamic haptic effect. The flow proceeds to 640.

At 640, the dynamic haptic effect is retrieved from the haptic effect file. A device can read the haptic effect file and retrieve the dynamic haptic effect. Where the haptic effect file includes one or more other haptic effects, the device can identify the dynamic haptic effect based on a value included within the dynamic haptic effect. The flow proceeds to 650.

At 650, the dynamic haptic effect is interpreted. A device can interpret the dynamic haptic effect by sequentially reading the first key frame and the second key frame included within the dynamic haptic effect. Where the dynamic haptic effect includes additional key frames, the device can further interpret the dynamic haptic effect by sequentially reading the additional key frames. The device can further interpret the dynamic haptic effect by receiving a dynamic value and selecting two basis haptic effects stored within the dynamic haptic effect based on the received dynamic value. The device can further select two basis haptic effects stored within the dynamic haptic effect based on the fact that the received dynamic value falls within two interpolant values that are stored within the dynamic haptic effect, where the two interpolant values corresponds to the two basis haptic effects. The flow proceeds to 660.

At 660, the dynamic haptic effect is generated. The dynamic haptic effect can be generated based on the two selected basis haptic effects. More specifically, the dynamic haptic effect can be generated by interpolating the two selected basis haptic effects based on the received dynamic value. In certain embodiments, a value for each parameter of the dynamic haptic effect can be calculated by interpolating a value of the parameter of the first selected basis haptic effect with a value of the parameter of the second selected basis haptic effect, using an interpolation function. The interpolation of each parameter value of the dynamic haptic effect can be based upon where the received dynamic value falls between the first interpolant value that corresponds to the first selected basis haptic effect and the second interpolant value that corresponds to the second selected basis haptic effect. In the illustrated embodiment, a dynamic haptic effect can be generated by interpolating two basis haptic effects. Such an interpolation can be a linear interpolation. However, this is only an example embodiment, and in alternate embodiments, a dynamic haptic effect can be generated by interpolating three or more basis haptic effects. Such an interpolation can be a spline interpolation, where a spline interpolation is a form of interpolation where an interpolating function is a special type of piecewise polynomial called a spline, and where the interpolating function is a function that can map an interpolant value to a dynamic haptic effect using two or more key frames. The dynamic haptic effect can further be generated by an actuator. The flow then ends.

FIG. 7 illustrates a flow diagram of the functionality of a haptic encoding module, according to another embodiment of the invention. The flow begins and proceeds to 710. At 710, a first key frame is received, where the first key frame has a first interpolant value and a first haptic effect. The first interpolant value can be a value that specifies where an interpolation occurs for the first haptic effect. The first key frame can include a repeat gap value. The first haptic effect can be a vibratory haptic effect, and can include a plurality of parameters. The plurality of parameters can include a magnitude parameter, a frequency parameter, and a duration parameter. The flow proceeds to 720.

At 720, a second key frame is received, where the second key frame has a second interpolant value and a second haptic effect. The second interpolant value can be a value that specifies where an interpolation occurs for the second haptic effect. The second key frame can include a repeat gap value. The second haptic effect can be a vibratory haptic effect, and can include a plurality of parameters. The plurality of parameters can include a magnitude parameter, a frequency parameter, and a duration parameter. The flow proceeds to 730.

At 730, a haptic effect signal is generated using the first key frame and the second key frame. The haptic effect signal can further include an indication of an end of the haptic effect signal. The haptic effect signal can further include a haptic effect storage block, where the first haptic effect and the second haptic effect can be stored within the haptic effect storage block. The haptic effect signal can further include additional key frames. In the illustrated embodiment, the haptic effect signal can be generated using two key frames, where each key frame includes a haptic effect. However, this is only an example embodiment, and in alternate embodiments, a haptic effect can be generated using three or more key frames, where each key frame includes a haptic effect. The flow proceeds to 740.

At 740, the haptic effect signal is stored within a haptic effect file. A format of the haptic effect file can be a binary format. Alternatively, the format of the haptic effect file can be an XML format. The haptic effect signal can be stored along with one or more other haptic effect signals within the haptic effect file. At least one of the other haptic effect signals can include two or more key frames. The flow proceeds to 750.

At 750, the haptic effect signal is retrieved from the haptic effect file. A device can read the haptic effect file and retrieve the haptic effect signal. Where the haptic effect file includes one or more other haptic effect signals, the device can identify the haptic effect signal based on a value included within the haptic effect signal. The flow proceeds to 760.

At 760, a drive signal is applied to a haptic output device according to the haptic effect signal. This can cause the haptic output device to produce a dynamic haptic effect consistent with the haptic effect signal. The flow proceeds to 770.

At 770, the drive signal is generated using the haptic output device. The flow then ends.

Thus, in one embodiment, a system can be provided that can store one or more dynamic haptic effects on a disk, memory, or any computer-readable storage medium. The system can further retrieve the one or more dynamic haptic effects and output the one or more dynamic haptic effects. A dynamic haptic effect can be based on a plurality of haptic effects. Thus, the system can store information regarding a small number of haptic effects, yet the system can output hundreds or thousands of dynamic haptic effects based on the small number of haptic effects. This can save storage space, and allow for a more efficient mechanism for storing and retrieving dynamic haptic effects. Further, a format of a haptic effect file that stores the one or more dynamic haptic effects can be flexible, so that a haptic effect designer is not limited to a small number of file formats. This allows an effect designer more flexibility in creating the dynamic haptic effects.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to produce a haptic effect, the producing comprising:
   detecting a user input using a pressure sensor;
   generating an input signal in response to the detection of the user input;
   displaying a user interface; and
   generating the haptic effect based on the input signal, wherein the haptic effect is associated with one or more elements of the user interface,
   wherein the haptic effect includes a first key frame and a second key frame, the first key frame including a first interpolant value and a first haptic effect, and the second key frame including a second interpolant value and a second haptic effect, wherein the first interpolant value is a value that specifies where an interpolation occurs for the corresponding first haptic effect, and wherein the second interpolant value is a value that specifies where an interpolation occurs for the corresponding second haptic effect.

2. The non-transitory computer-readable medium of claim 1, wherein a swiping motion is detected by the pressure sensor.

3. The non-transitory computer-readable medium of claim 1, wherein a two-dimensional motion or three-dimensional motion is detected by the pressure sensor.

4. The non-transitory computer-readable medium of claim 1, wherein the user interface includes a scroll list.

5. The non-transitory computer-readable medium of claim 1, further comprising:
   generating a dynamic haptic effect by interpolating the first haptic effect and the second haptic effect.

6. The non-transitory computer-readable medium of claim 1, wherein the generation of the haptic effect includes generating a drive signal for a haptic output device.

7. A method of producing a haptic effect executed by a processor, the method comprising:
   detecting a user input using a pressure sensor;
   generating an input signal in response to the detection of the user input;
   displaying a user interface; and
   generating the haptic effect based on the input signal, wherein the haptic effect is associated with one or more elements of the user interface,
   wherein the haptic effect includes a first key frame and a second key frame, the first key frame including a first interpolant value and a first haptic effect, and the second key frame including a second interpolant value and a second haptic effect, wherein the first interpolant value is a value that specifies where an interpolation occurs for the corresponding first haptic effect, and wherein the second interpolant value is a value that specifies where an interpolation occurs for the corresponding second haptic effect.

8. The method of claim 7, wherein a swiping motion is detected by the pressure sensor.

9. The method of claim 7, wherein a two-dimensional motion or three-dimensional motion is detected by the pressure sensor.

10. The method of claim 7, wherein the user interface includes a scroll list.

11. The method of claim 7, further comprising:
    generating a dynamic haptic effect by interpolating the first haptic effect and the second haptic effect.

12. The method of claim 7, wherein the generation of the haptic effect includes generating a drive signal for a haptic output device.

13. A device comprising:
a processor; and
a memory storing one or more programs for execution by the processor, the one or more programs including instructions for:
detecting a user input using a pressure sensor;
generating an input signal in response to the detection of the user input;
displaying a user interface; and
generating a haptic effect based on the input signal, wherein the haptic effect is associated with one or more elements of the user interface,
wherein the haptic effect includes a first key frame and a second key frame, the first key frame including a first interpolant value and a first haptic effect, and the second key frame including a second interpolant value and a second haptic effect, wherein the first interpolant value is a value that specifies where an interpolation occurs for the corresponding first haptic effect, and wherein the second interpolant value is a value that specifies where an interpolation occurs for the corresponding second haptic effect.

14. The device according to claim 13, wherein a swiping motion is detected by the pressure sensor.

15. The device according to claim 13, wherein a two-dimensional motion or three-dimensional motion is detected by the pressure sensor.

16. The device according to claim 13, wherein the user interface includes a scroll list.

17. The device according to claim 13, further comprising:
generating a dynamic haptic effect by interpolating the first haptic effect and the second haptic effect.

* * * * *